Figure 1:
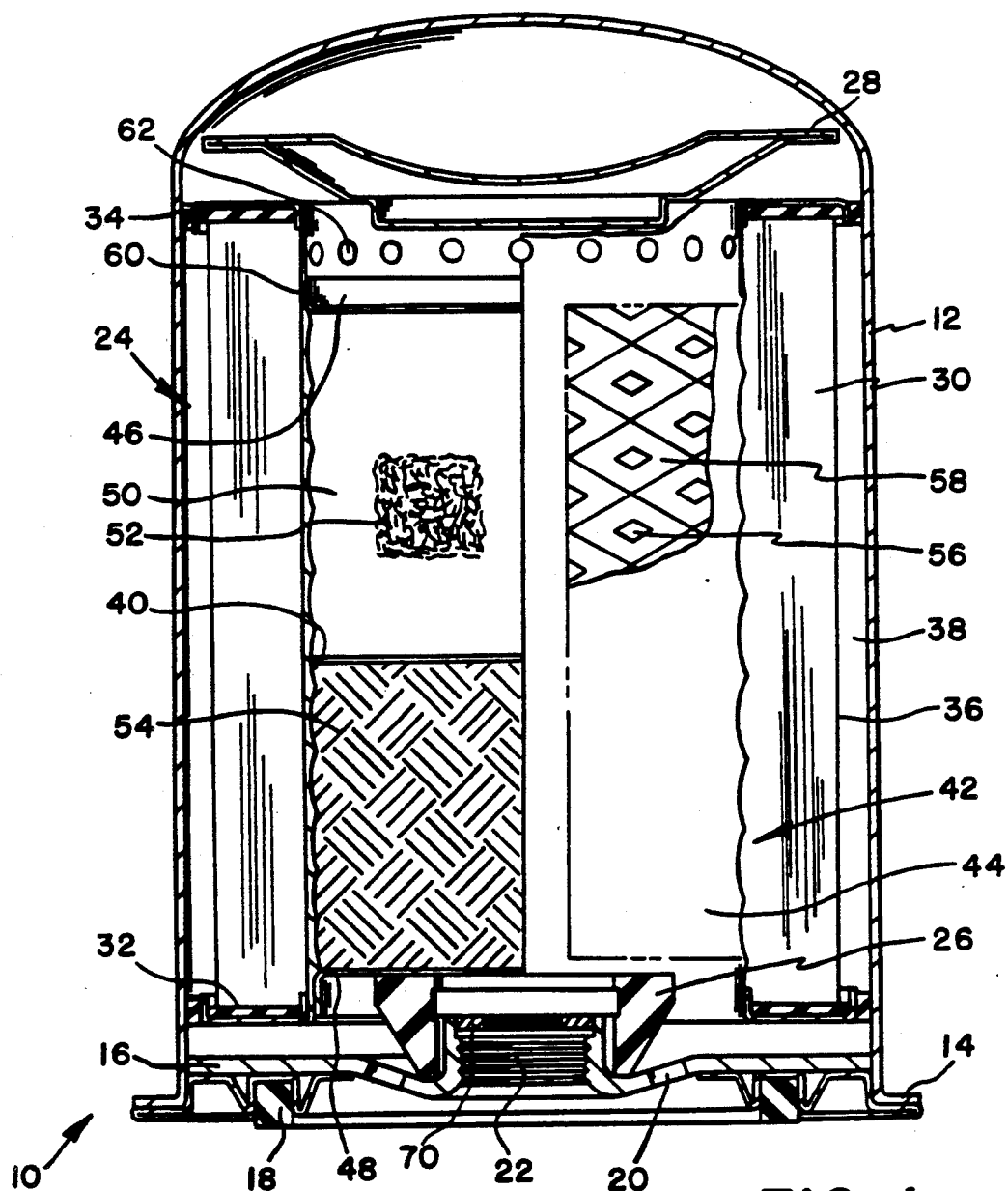

United States Patent [19]

Reynolds

[11] Patent Number: 5,094,745
[45] Date of Patent: Mar. 10, 1992

[54] COOLANT FILTER WITH INHIBITOR PACK

[75] Inventor: Gilbert C. Reynolds, Smithfield, R.I.

[73] Assignee: Allied-Signal Inc., Morristown, N.J.

[21] Appl. No.: 519,060

[22] Filed: May 4, 1990

[51] Int. Cl.⁵ ............... B01D 27/02; B01D 27/06; B01D 35/02
[52] U.S. Cl. .................... 210/266; 210/282; 210/315; 210/317; 210/440; 210/443; 210/493.1; 210/499
[58] Field of Search ............... 210/264, 266, 282, 283, 210/290, 314, 315, 317, 440, 443, 493.1, 497.01, 499

[56] References Cited

U.S. PATENT DOCUMENTS

| | | |
|---|---|---|
| 2,244,574 | 6/1941 | Rogers . |
| 2,371,444 | 3/1945 | Hubert . |
| 2,785,805 | 3/1957 | Hough . |
| 3,118,836 | 1/1964 | Briggs ............... 210/493.1 |
| 3,174,625 | 3/1965 | Briggs ............... 210/493.1 |
| 3,187,895 | 6/1965 | Pall et al. ........... 210/493.1 |
| 3,552,553 | 1/1971 | Reading ............. 210/493.1 |
| 3,645,402 | *2/1972 | Alexander et al. . |
| 3,726,262 | 4/1973 | Moon . |
| 3,776,384 | 12/1973 | Offer . |
| 3,985,657 | 10/1976 | Coughlan ............ 210/440 |
| 4,265,748 | 5/1981 | Villani et al. . |
| 4,379,052 | 4/1983 | Stearns . |
| 4,575,422 | 3/1986 | Zimmer . |

FOREIGN PATENT DOCUMENTS 639845 3/1964 Belgium .
2306336 10/1976 France .

*Primary Examiner*—Robert A. Dawson
*Assistant Examiner*—Wanda L. Millard
*Attorney, Agent, or Firm*—Ken C. Decker; William N. Antonis

[57] ABSTRACT

A filter/conditioner for filtering and dispensing conditioners and inhibitors to the engine coolant of an internal combustion engine includes a circumferentially extending array of filtering media circumscribing a container defining a compartment which contains a coolant softener/conditioner and a rust inhibitor pellet which dissolves to release rust inhibitor into the coolant. A diamond design is embossed on the outer circumferential surface of the container, so that grooves provided to permit coolant to travel to one of the ends of the container, and then through the container where the coolant is treated.

12 Claims, 1 Drawing Sheet

COOLANT FILTER WITH INHIBITOR PACK

This invention relates to a device for filtering and treating liquid coolant in an internal combustion engine.

Some engine coolant systems, particularly those used in heavy duty vehicles, commonly use devices which filter and chemically treat the liquid coolant in the radiator system. This chemically treatment commonly includes softening and conditioning the coolant, and adding rust inhibitors to the coolant to replace those depleted from the coolant during normal engine operation. The chemical used to soften and treat the coolant is an ion exchange resin normally in the form of relatively small beads, while the rust inhibitor is a relatively large pellet. The chemicals are normally included within a filter which removes particulate matter from the coolant. Accordingly, manufacture of prior art radiator filters required that filter manufacturers provide special handling equipment to process these chemicals during manufacture of the filter cartridge assembly. Furthermore, coolant filters must be designed to assure that the ion exchange resin beads are contained within the filter assembly and are not carried out of the filter assembly by the coolant. It is also preferable that all the coolant communicated through the coolant filter be treated by the chemicals; accordingly, the possibility that some of the coolant bypasses the chemical treatment is minimized. A typical prior art coolant filter and chemical treatment device is disclosed in U.S. Pat. No. 3,645,402.

The present invention provides a coolant filter comprising a conventional, circumferentially extending array of pleated filter paper which is installed within a conventional metal spin-on filter can which is installed on the mounting bracket provided by the engine manufacturer. The pleated paper array circumscribes a sealed metal container which contains ion exchange beads for softening and conditioning the coolant, and also includes an inhibitor pellet which dispenses rust inhibitor into the coolant. Coolant is first directed through the filtering media, which removes particulate matter from the coolant, and then is directed to flow axially through the inhibitor pack. Screened inlet and outlet openings through which the coolant passes through the metal container assure that the ion exchange resin beads remain within the container. The design also assures that all of the coolant communicated through the filter media is also exposed to the chemicals within the container. Accordingly, since all of the chemicals are within a separate, sealed container, handling of chemicals during filter manufacture is minimized, and proper treatment of the coolant is assured.

Figure 2:
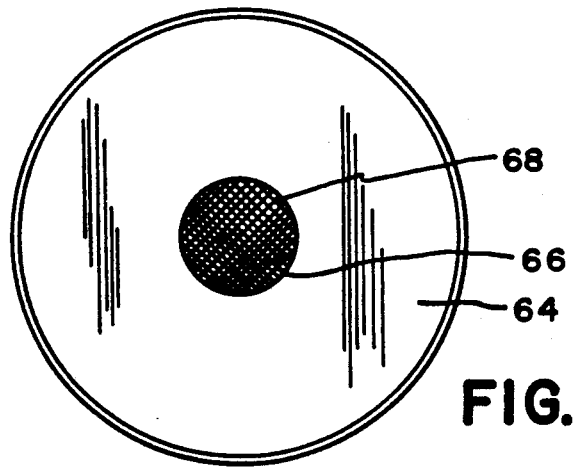

These and other advantages of the present invention will become apparent from the following description, with reference to the accompanying drawings, in which FIG. 1 is a longitudinal cross-sectional view of a coolant treatment device made pursuant to the teachings of the present invention; and FIG. 2 is a view taken substantially along lines 2—2 of FIG. 1.

Referring now to the drawings, an engine coolant filter and conditioner generally indicated by the numeral 10 includes a cupshaped housing 12 having an open end 14 closed by an engine mount engaging end closure member 16. Closure 16 carries a circumferentially extending sealing ring 18 for sealing engagement between the closure 16 and the mounting surface (not shown) upon which the filter/conditioner 10 is mounted. End closure 16 also includes a circumferentially extending array of inlet openings 20 for communication of engine coolant into the housing 12 and a threaded outlet opening 22 for communication of coolant out of the housing 12. Outlet opening 22 is threaded for engagement with a mounting post (not shown) projecting from the mounting surface and enables the filter/conditioner 10 to be retained on the engine during normal operation thereof, but permits the filter/conditioner 10 to be removed from the engine when replacement is necessary merely by "spinning off" the filter/conditioner 10 from the mounting post to permit installation of a new filter/conditioner in a manner well known to those skilled in the art.

Received within the cupshaped housing 12 is a cartridge assembly generally indicated by the numeral 24. Cartridge assembly 24 is supported on the closure 16 by a grommet 26, and is yieldably urged toward the closure 16 by a spring retainer 28 between the closed end of the housing 12 and corresponding end of the cartridge 24. The cartridge 24 consists of a circumferentially extending array of pleated filter paper 30. The upper and lower edges of the pleats comprising the media 30 are sealed by potting material dispensed in circumferentially extending end caps 32, 34. The outer circumference defined by the outer tips 36 of the pleats cooperate with the inner circumferential surface defined by the housing 12 to define an inlet chamber 38 therebetween, which is in constant fluid communication with the array of inlet openings 20.

The ends defined by the inner tips 40 of the pleated filter media 30 receives a container 42 which is preferably made of metal. Container 42 comprises an outer circumferential wall 44 and a pair of opposite end walls 46, 48, which close the ends of the container and extend transversely with respect to the circumferentially extending wall 44. The circumferentially extending wall 44 and the end walls 46, 48 define a chamber 50 therewithin. Within the chamber 50 are coolant conditioning beads 52 and an inhibitor pellet 54. The beads 52 contain an ion exchange resin which softens and conditions the coolant communicated through the chamber 50, as will hereinafter be described. Similarly, the inhibitor pellet 54 dissolves as the coolant passes through the chamber 50, and releases a rust and corrosion inhibitor into the coolant. The inhibitor pellet 54 and coolant conditioning beads 52 are conventional, and are available from a number of sources.

A diamond-shaped pattern is embossed on the outer circumferential surface of the wall 44. The diamond-shaped pattern consists of raised portions 56 which are separated by recessed grooves 58. The raised portions 56 in the repeated diamond pattern engage the inner tips 40 of the filter media 30 and prevent the latter from collapsing sufficiently, due to pressure differentials across the pleats, to close off the passages 58. Accordingly, the passages 58 remain open, and the passages or grooves 58 provide a path whereby coolant communicated through the filter media 30 drains downwardly viewing FIG. 1. It will be noted that the end 46 is set back from the end of the wall 44 so that the latter forms a circumferentially extending skirt 60. A circumferentially extending array of apertures 62 are provided in the skirt 60 and permit coolant draining down the grooves 58 to communicate into the recess defined by the skirt 60. Each of the end walls 46, 48 are identical, each consist of a disc 64 defining an annular central opening 66. A wire mesh screen 68 closes the openings 66. The mesh size of the screen is sufficiently small that the ion exchange resin beads 52 are contained within the chamber 50.

When the filter/conditioner 10 is installed on a vehicle, engine coolant is pumped through the inlet openings 20 into the inlet chamber 38. Coolant then passes the filter media 30, where particulate matter entrained in the coolant is filtered out. After passing through the media 30, the coolant travels along the passages 58 and through the openings 62, and into the chamber 50. Here the coolant is treated by the ion exchange resin beads 52 and by the dissolving inhibitor pellet 54 before traveling out through the mesh screen carried in the end 48 before passing through the outlet opening 22 and back to the engine. Accordingly, it will be seen that all of the coolant which is received within the filter/conditioner 10 also passes through the chamber 50 so it is treated before being communicated back into the engine. Since none of the coolant is bypassed around the container 42, proper treatment of the coolant each time it passes through the filter/conditioner 10 is assured. The circumferentially extending wall 44 of the container 42 not only provides a part of the enclosure in which the coolant conditioning material is contained, but the circumferentially extending wall also prevents collapse of the pleats of the filter media 30, and still further provides groove which allow the coolant to travel to the apertures 62. Since both of the end walls 46, 48 contain a screen 68 covering the corresponding apertures 66, and since the mesh size of the this screen is smaller than the size of the beads 52, the ion exchange resin beads 52 are retained in the container 42. However, a safety screen 70 is inserted into end cap 32 during assembly. The safety screen 70 is constructed of metal and has a wire mesh of sufficient small size to prevent exchange resin beads 52 from passing into the outlet coolant stream in the event there should be a malfunction in the container 40 that would allow the ion exchange beads to escape.

I claim:

1. Device for treating liquid coolant in a coolant system of an internal combustion engine comprising a housing having a housing inlet for receiving said liquid coolant from said coolant system and a housing outlet for returning liquid coolant to said coolant system, a container within said housing for dispensing coolant treatment material to the coolant within said housing, said container defining a chamber therewithin containing coolant treatment material and having a container inlet and container outlet for said chamber, said container outlet being communicated to said housing outlet, and means for directing substantially all of said coolant entering said housing inlet to said container inlet so that substantially all of the coolant communicated through the housing inlet is communicated through said chamber, said chamber containing said coolant treatment material for treatment of said coolant as it passes through the chamber, said container including a circumferentially extending wall, and a circumferentially extending array of filtering media circumscribing the circumferentially extending wall of said container for filtering said coolant after the coolant passes through the housing inlet but before said coolant is directed to said container inlet, said directing means including grooves on said circumferentially extending wall for carrying said coolant from said filtering media to said container inlet.

2. Device for treating liquid coolant as claimed in claim 1, wherein said container includes a pair of opposing end walls, one of said end walls defining said container inlet, the container outlet being defined on the opposite end wall, said grooves defining a path for communicating said coolant to said one end wall.

3. Device for treating liquid coolant as claimed in claim 2, wherein said directing means includes a circumferentially extending array of apertures in said circumferentially extending wall for communicating said coolant from said grooves to said container inlet.

4. Device for treating liquid coolant as claimed in claim 2, wherein the coolant treatment material in said chamber includes beads of a size substantially smaller than the nominal size of the container inlet and container outlet, and screens having a mesh size smaller than said beads covering the container inlet and container outlet to thereby permit the coolant to pass through the chamber while assuring that the beads are retained within said chamber.

5. Device for treating liquid coolant as claimed in claim 2, wherein said housing includes a mount engaging end for mounting on a mounting surface of said coolant system and an opposite end, said housing inlet and housing outlet being defined on said mount engaging surface, said other end wall of said container being mounted adjacent the mount engaging end, the one end wall of the container being located adjacent the opposite end of the housing.

6. Device for treating liquid coolant as claimed in claim 1, wherein said grooves are defined between raised portions on aid circumferentially extending wall, said raised portions engaging said media to prevent collapse of said media against said circumferentially extending wall to pressure differentials across said media from closing said grooves.

7. Device for treating liquid coolant as claimed in claim 1, wherein said grooves are defined between raised portions on said circumferentially extending wall, said media comprising a circumferentially extending array of radially tapering pleats, said pleats having inner tips adjacent the circumferentially extending wall and opposite outer tips, said raised portions engaging said inner tips to prevent collapse of said pleats against said circumferentially extending wall to pressure differentials across said media from closing said passages.

8. Device for treating liquid coolant as claimed in claim 1, wherein said container includes a circumferentially extending wall and a a pair of opposing end walls, comprising a one end wall and an other end wall, said one end wall defining said container inlet, the container outlet being defined on the other end wall.

9. Device for treating liquid coolant in a coolant system of an internal combustion engine comprising an housing having a housing inlet for receiving said liquid coolant from said coolant system and a housing outlet for returning liquid coolant to said coolant system, a container within said housing for dispensing coolant treatment material to the coolant within said housing, said container defining a chamber therewithin containing coolant treatment material and having a container inlet and container outlet for said chamber, said container outlet being communicated to said housing outlet, and means for directing substantially all of said coolant entering said housing inlet to said container inlet so that substantially all of the coolant communicated through the housing inlet is communicated through said chamber, said chamber containing said coolant treatment material for treatment of said coolant as it passes through the chamber, said container including a circumferential extending wall and a pair of opposing end walls comprising a one end wall and an other end wall, said one end wall defining said container inlet, the container outlet being defined on the other end wall, said directing means including grooves defining a path for communicating said coolant to said one end wall.

10. Device for treating liquid coolant as claimed in claim 9, wherein the coolant treatment material in said includes beads of a size substantially smaller than the nominal size of the container inlet and container outlet, and screens having a mesh size smaller than said beads covering the container inlet and container outlet to thereby permit the coolant to pass through the chamber while assuring that the beads are retained within said chamber.

11. Device for treating liquid coolant as claimed in claim 9, wherein said housing includes a mount engaging end for mounting on a mounting surface of said coolant system and an opposite end, said housing inlet and housing outlet being defined on said mount engaging surface, said other end wall of said container being mounted adjacent the mount engaging end, the one end wall of the container being located adjacent the opposite end of the housing.

12. Device for treating liquid coolant in a coolant system of an internal combustion engine comprising an housing having a housing inlet for receiving said liquid coolant from said coolant system and a housing outlet for returning liquid coolant to said coolant system, a container within said housing for dispensing coolant treatment material to the coolant within said housing, said container defining a chamber therewithin containing coolant treatment material and having a container inlet and container outlet for said chamber, said container outlet being communicated to said housing outlet, and means for directing substantially all of said coolant entering said housing inlet to said container inlet so that substantially all of the coolant communicated through the housing inlet is communicated through said chamber, said chamber containing said coolant treatment material for treatment of said coolant as it passes through the chamber, said container including a liquid coolant impermeable circumferentially extending wall, and a circumferentially extending array of filtering media circumscribing the circumferentially extending wall of said container for filtering said coolant after the coolant passes through the housing inlet but before said coolant is directed to said container inlet.

* * * * *